United States Patent
Mao et al.

(10) Patent No.: US 8,141,156 B1
(45) Date of Patent: Mar. 20, 2012

(54) METHOD AND APPARATUS FOR MITIGATING ROUTING MISBEHAVIOR IN A NETWORK

(75) Inventors: Zhuoqing Morley Mao, Ann Arbor, MI (US); Jia Wang, Randolph, NJ (US); Ying Zhang, Ann Arbor, MI (US)

(73) Assignees: AT&T Intellectual Property II, L.P., Atlanta, GA (US); University of Michigan, Ann Arbor, MI (US)

( * ) Notice: Subject to any disclaimer, the term of this patent is extended or adjusted under 35 U.S.C. 154(b) by 1037 days.

(21) Appl. No.: 11/321,940

(22) Filed: Dec. 28, 2005

(51) Int. Cl.
*G06F 11/00* (2006.01)
(52) U.S. Cl. ............... 726/23; 726/11; 726/12; 726/13; 726/14; 726/15; 726/22; 726/24; 726/25; 709/223; 709/224; 709/225; 708/238; 708/244
(58) Field of Classification Search ............... 726/22–25, 726/11–15, 3; 709/240, 223–225; 370/235, 370/351, 254, 389; 713/168; 708/238–244
See application file for complete search history.

(56) References Cited

U.S. PATENT DOCUMENTS

| | | | |
|---|---|---|---|
| 7,359,377 B1 * | 4/2008 | Kompella et al. | 370/389 |
| 2003/0088671 A1 * | 5/2003 | Klinker et al. | 709/225 |
| 2004/0025018 A1 * | 2/2004 | Haas et al. | 713/168 |
| 2005/0025118 A1 * | 2/2005 | Hao et al. | 370/351 |
| 2005/0198382 A1 * | 9/2005 | Salmi et al. | 709/240 |
| 2006/0133280 A1 * | 6/2006 | Natchu | 370/235 |
| 2007/0047464 A1 * | 3/2007 | Guingo et al. | 370/254 |

OTHER PUBLICATIONS

Lixin Gao, University of Massachusetts, Amherst, MA "On inferring autonomous system relationships in the internet" IEEE Press, IEEE/ACM transactions on Networking, vol. 9, Issue 6 (Dec. 2001) pp. 733-745 2001, ISSN: 1063-6692.*

* cited by examiner

*Primary Examiner* — Taghi Arani
*Assistant Examiner* — Jason Lee (57) ABSTRACT

Method and apparatus for mitigating routing misbehavior in a network is described. In one example, routing protocol traffic is received from a remote router destined for a local router. The routing protocol traffic is parsed to identify a subset of traffic. The subset of traffic is normalized to identify and correct misconfigured routing updates. The routing protocol traffic is provided to the local router. In one embodiment, the subset of traffic is normalized by at least one of detecting and correcting routing protocol semantics, detecting and correcting violations in routing policies, detecting and correcting routing anomalies, or mitigating routing instability.

17 Claims, 4 Drawing Sheets

METHOD AND APPARATUS FOR MITIGATING ROUTING MISBEHAVIOR IN A NETWORK

BACKGROUND OF THE INVENTION

1. Field of the Invention

Embodiments of the present invention generally relate to routing in a packet network and, more particularly, to a method and apparatus for mitigating routing misbehavior in a network.

2. Description of the Related Art

The Internet originated from a research network where both end hosts, as well as network components such as routers and switches, are assumed to be well behaved or cooperative. The original Internet design philosophy addresses physical failures well; however, it fails to address problems resulting from misbehaving or non-cooperative end users, network components and misconfigurations. Routers inside the network can misbehave due to misconfigurations or malicious attackers. Today, the Internet has no robust defense mechanisms against misbehaving routers, leaving the Internet routing infrastructure largely unprotected.

As used herein, the control plane is defined as the Internet routing layer, and the data plane is defined as the packet forwarding layer. In the control plane, routing updates are exchanged among routers using a routing protocol. Routers within a domain typically use an interior gateway protocol (IGP), such as open shortest path first (OSPF), to exchange routing updates. Routing updates are exchanged between domains using an exterior gateway protocol (EGP), such as the border gateway protocol (BGP).

BGP is the inter-domain routing protocol that autonomous systems use to exchange information about how to reach destination address blocks or prefixes. Each AS is a network entity with well-defined routing policies. BGP sessions between routers within the same AS are Internal BGP (iBGP) sessions and can traverse through several Internet Protocol (IP) hops. BGP sessions between routers belonging to different AS are External BGP (eBGP) sessions and usually are established over a single hop to ensure low latency and loss rate.

There are four types of BGP messages within BGP traffic: OPEN, KEEPALIVE, NOTIFICATION and UPDATE. The OPEN message is used to establish the BGP session between two routers. Once the session is established, BGP neighbors send each other periodic KEEPALIVE messages to confirm the liveness of the connection. If an error occurs during the life time of a BGP session, a NOTIFICATION message is sent to signal the presence of such error before the underlying TCP connection is closed. The UPDATE message is the primary message used to communicate information between BGP routers. There are two types of BGP UPDATE messages: announcements and withdrawals. Announcements indicate the availability of a new route to a destination IP prefix. Withdrawals indicate that the sender no longer has a route to the destination.

BGP is a path vector protocol, as the AS_PATH attribute contains the sequence of autonomous systems of the route. Each BGP UPDATE message contains other path attributes such as NEXT_HOP, ORIGIN, MED (Multiple-Exit-Discriminator), COMMUNITY, ATOMIC_AGGREGATE and AGGREGATOR. All such attributes can influence the route selection decision. Some of the attributes such as ORIGIN, AS_PATH, and NEXT_HOP are mandatory. By representing the path at the AS level, BGP hides the details of the topology and routing inside each network. BGP is also incremental, i.e. every BGP UPDATE message indicates a routing change. In addition, BGP is policy-oriented. Rather than selecting the route with the shortest AS path, routers can apply complex policies to influence the selection of the best route for each prefix and to decide whether to propagate this route to neighbors.

There is an inherent trust relationship in the routing system: a router always trusts the routing updates advertised by its neighboring routers. A router assumes that the routing information in the updates is accurate, i.e., usable for forwarding traffic that will follow the corresponding path information in the update. However, router misconfigurations, routing attacks, and inherent routing problems, such as deflection, often render this assumption incorrect. Accordingly, there exists a need in the art for a method and apparatus for mitigating routing misbehavior in a network.

SUMMARY OF THE INVENTION

Method and apparatus for mitigating routing misbehavior in a network is described. In one embodiment, routing protocol traffic is received from a remote router destined for a local router. The routing protocol traffic is parsed to identify a subset of traffic. The subset of traffic is normalized to identify and correct misconfigured routing updates. The routing protocol traffic is provided to the local router. In one embodiment, the subset of traffic is normalized by at least one of detecting and correcting routing protocol semantics, detecting and correcting violations in routing policies, detecting and correcting routing anomalies, or mitigating routing instability.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Method and apparatus for mitigating routing misbehavior in a network is described. In one embodiment, a route normalization framework is provided to correct routing traffic for a local router on the fly. A RouteNormalizer is disposed between a local router to be protected and a remote router whose updates may be untrustworthy. The RouteNormalizer essentially acts as a firewall for the local router by identifying known routing attacks and stopping or correcting such attacks early. Use of the RouteNormalizer does not require changes to routing protocols, routers, or router configurations. As used herein, the local router is the router that is under the protection of the RouteNormalizer in the same autonomous system (AS). The remote router refers to the other router of a border gateway protocol (BGP) session, typically not within the same AS as the local router.

Figure 1:
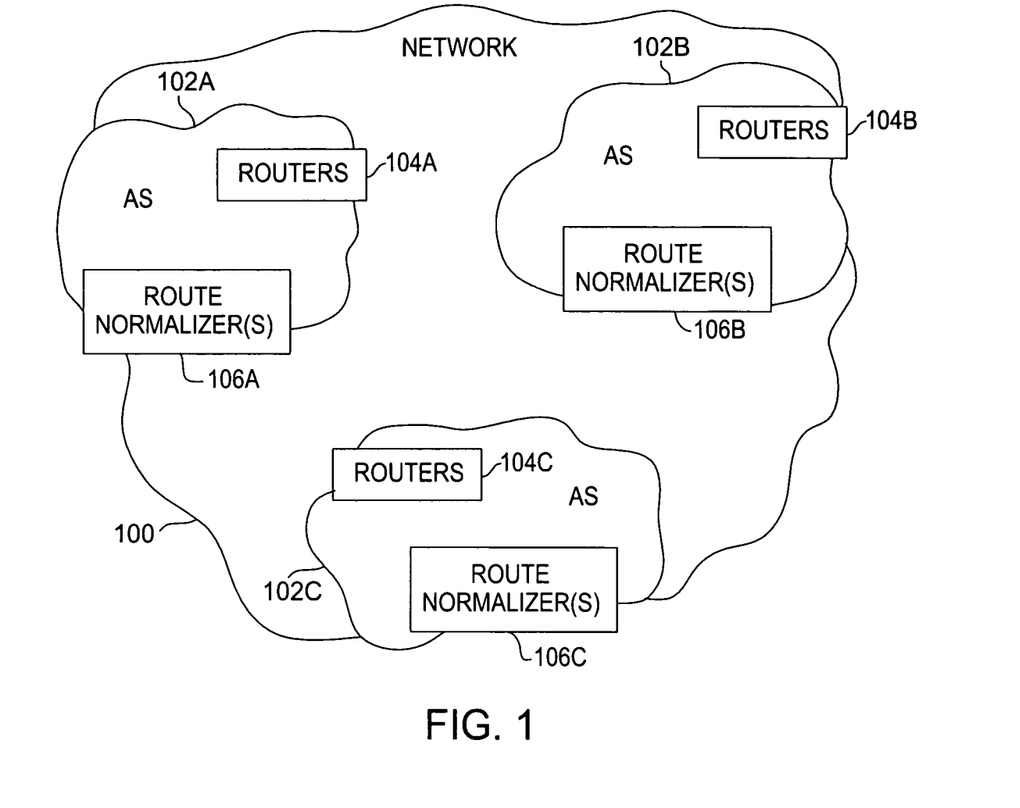
FIG. 1 is a block diagram depicting an exemplary embodiment of a network in accordance with one or more aspects of the invention.

FIG. 1 is a block diagram depicting an exemplary embodiment of a network 100 in accordance with one or more aspects of the invention. The network 100 illustratively includes autonomous systems 102A, 102B, and 102C (collectively autonomous systems 102). The AS 102A includes routers 104A and one or more RouteNormalizers 106A. The AS 102B includes routers 104B and one or more RouteNormalizers 106B. The AS 102C includes routers 104C and one or more RouteNormalizers 106C. Each of the RouteNormalizers 106A, 106B, and 106C (collectively RouteNormalizers 106) is configured to protect one or more routers in their respective autonomous systems. As described below, in one embodiment, each of the RouteNormalizers 106 includes one or more of the following functionalities: (i) identify and correct anomalous routing updates due to misconfigurations and software errors; (ii) identify and mitigate routing attacks against routing protocols and routers; (iii) mitigate routing instability by dampening routing updates; (iv) perform load management by rate-limiting routing updates; and (v) emulate features not available on local routers (e.g., graceful restart). Although only three autonomous systems are shown by way of example, it is to be understood that the network 100 may include any number of autonomous systems.

Figure 2:
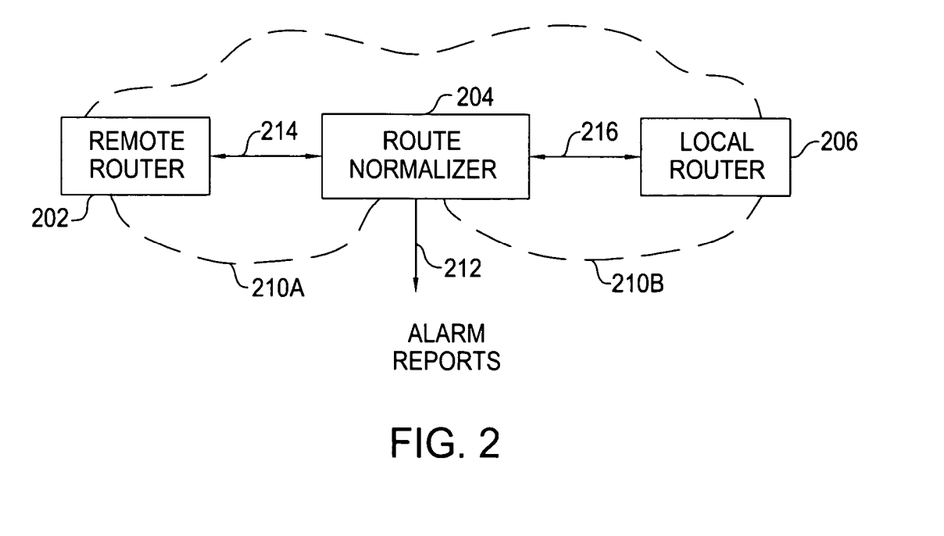
FIG. 2 is a block diagram depicting an exemplary embodiment of a RouteNormalizer architecture in accordance with one or more aspects of the invention.

FIG. 2 is a block diagram depicting an exemplary embodiment of a RouteNormalizer architecture 200 in accordance with one or more aspects of the invention. The architecture 200 includes a remote router 202, a RouteNormalizer 204, and a local router 206. In the present example, the RouteNormalizer 204 is used for a single BGP session protecting the local router 206 from the remote router 202. The RouteNormalizer 204 receives BGP traffic from the remote router 202 via a link 214. The RouteNormalizer 204 provides normalized BPG traffic to the local router 206 via a link 216. The RouteNormalizer 204 also receives BGP traffic from the local router 206 via the link 216 and provides normalized BGP traffic to the remote router 202 via the link 214. In addition to providing normalized BGP traffic as output, the RouteNormalizer 204 provides alarm reports via an interface 212. The alarm reports may be collected by a network management system (not shown) in the network.

In one embodiment, an end-to-end BGP session 208 is established between the remote router 202 and the local router 206. The RouteNormalizer 204 is deployed using a transparent transmission control protocol (TCP) proxy setup, requiring no changes to the BGP session 208. EBGP sessions can use the "eBGP multihop" option provided in BGP to support the RouterNormalizer 204. The RouteNormalizer 204 intercepts packets between the remote router 202 and the local router 206. The RouteNormalizer 204 inserts, modifies, or drop the intercepted packets. The presence of the RouteNormalizer 204 is completely transparent to the remote router 202 and the local router 206. The advantage of placing the RouteNormalizer 204 on the data path is that is also observes the data traffic and can use such information to confirm reachability of certain destinations. However, the disadvantage of this transparent setting is that the RouteNormalizer 204 is required to operate at line speed, as not only BGP traffic, but also data traffic passes through it.

In another embodiment, both the remote router 202 and the local router 206 are aware of the presence of the RouteNormalizer 204 and establish two separate BGP sessions 210A and 210B. That is, the RouteNormalizer 204 is deployed using explicit TCP proxy setup. In the present embodiment, the RouteNormalizer 204 only receives the BGP traffic, and does not need to forward the data traffic.

For purposes of clarity by example, a single RouteNormalizer is shown deployed between a remote router and a local router. In general, an IP network consists of a number of BGP routers, each of which may peer with multiple routers. The RouteNormalizer may also be deployed to protect multiple local routers from one or more remote routers, or to protect a single local router from multiple remote routers. To load-balance the work of normalizing BGP traffic, multiple RouteNormalizers can be used. For example, network operators can deploy one RouteNormalizer in each region in its network.

Figure 3:
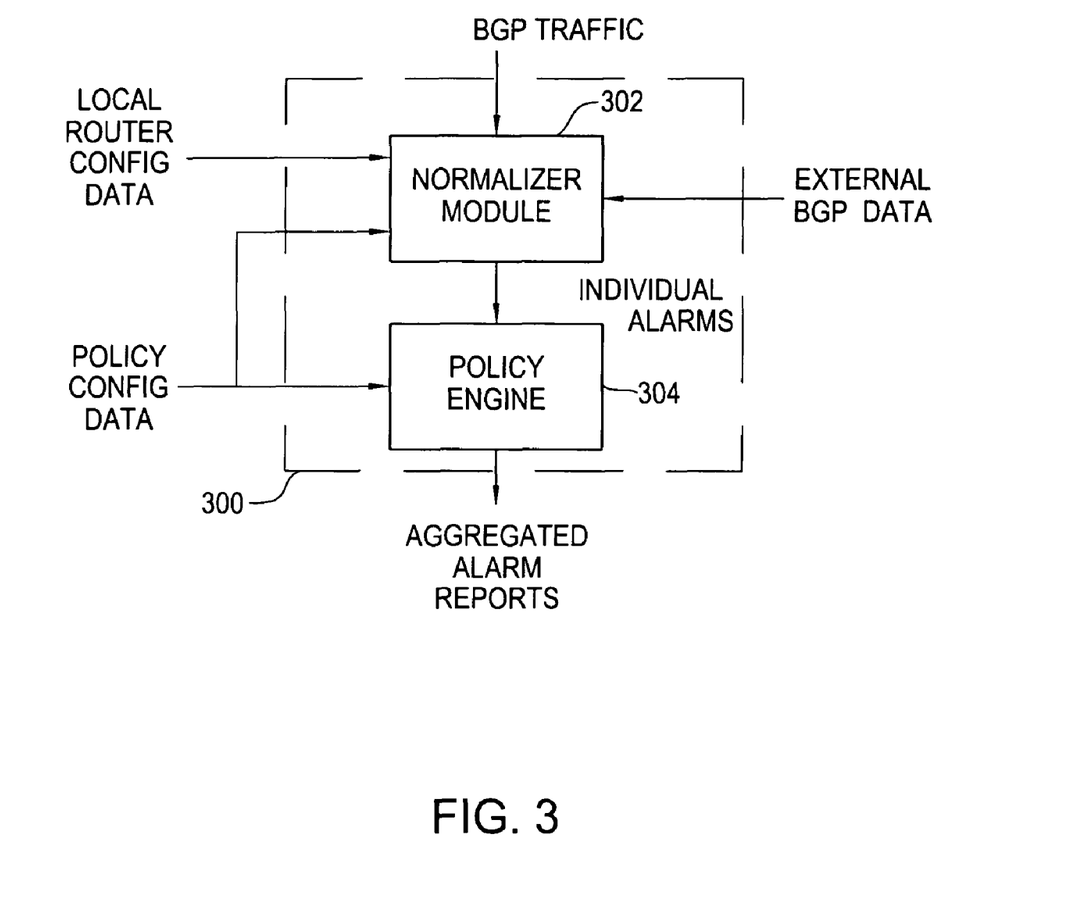
FIG. 3 is a block diagram depicting an exemplary embodiment of a RouteNormalizer in accordance with one or more aspects of the invention.

FIG. 3 is a block diagram depicting an exemplary embodiment of a RouteNormalizer 300 in accordance with one or more aspects of the invention. The RouteNormalizer 300 includes a normalizer module 302 and a policy engine 304. The normalizer module 302 is based on a rule set and the policy engine 304 combines individual alarms into aggregated alarm reports. The rule set in the normalizer module 302 concisely defines the type of routing anomalies of interest. The RouteNormalizer 300 is configured to receive BGP traffic from one or more remote routers, as well as from the local router being protected. The RouteNormalizer 300 may optionally receive the local router's policy configuration, policy settings for the RouteNormalizer 300, and/or external BGP data, such as inferred AS relationships. The RouteNormalizer 300 provides normalized BGP traffic as output and generates alarm reports. The RouteNormalizer 300 may also provide suggestions for policy modifications for the local router. Note that the RouteNormalizer 300 performs normalization on BGP traffic both destined to the local router, as well as originated by the local router. For purposes of clarity, the description below focuses on normalizing BGP traffic destined to the local router.

In particular, the normalizer module 302 interprets BGP traffic to identify and parse the four basic BGP message types. Most of the processing involves analyzing the BGP update messages to extract important information, such as prefixes and path attributes. After parsing, the normalizer module 302 identifies certain problems without resorting to the use of external information. Some of these problems can be directly corrected by setting the fields of BGP updates appropriately, as described below. Further processing of the BGP traffic is needed to identify routing anomalies. Some of these analyses require correlation of the current data with previously observed BGP updates and possibly external input data. Given that BGP uses a long-lived TCP connection and is a stateful protocol, the normalizer module 302 also keeps some state for detecting unexpected routing behavior. More complex processing for routing intrusion detection is also performed.

The policy engine 304 is customizable through the input policy configurations for the RouteNormalizer 300. The policy engine 304 allows customization of the output routing alarms by performing appropriate correlations to define the threshold values for generating alarms, and to define the appropriate responses to be taken. There can be many alarms associated with individual prefixes or ASes announcing suspicious routing updates. It is much more useful to combine relevant alarms into an aggregated report so that it is easier to identify the possible cause of routing problems. The policy configuration can also specify particular prefixes of interest so that these are more closely monitored. Such prefixes can be associated with important customers covered under particular service level agreements (SLAs) or prefixes carrying significant amount of traffic. While the implementation of the RouteNormalizer may be made publicly available, the policy configurations should be kept private to prevent attackers from taking advantage of the RouteNormalizer and evading the routing anomaly detection.

One of the goals of route normalization is to patch up potential ambiguities and eliminate incorrect BGP updates early. In one embodiment, the RouteNormalizer 300 may implement one or more of four general categories of functionality: (i) detection and correction of violations in BGP semantics; (ii) detection and correction of violations in routing policies; (iii) routing anomaly and intrusion detection; and (iv) mitigation of routing instability. Accordingly, there are three types of updates that the RouteNormalizer 300 can fix: (i) obvious violation of BGP routing semantics, (ii) clear violations of routing policies, and (iii) ambiguous routing updates containing unexpected routing information. Although in some cases, routing updates appear to be anomalous with no clear ways to correct them, the RouteNormalizer 300 could suggest the local router to prefer an alternate route or a route going through a different neighbor if one exists to improve the chance of correct forwarding behavior. The functionalities that can be implemented by the RouteNormalizer 300 are described immediately below.

I. Correct Violations of BGP Semantics

The RouteNormalizer 300 performs checks for detecting violations of BGP semantics in the routing updates. Routers may react differently depending on their implementations. In the ideal case, routers would drop these updates upon receiving them and optionally send back a NOTIFICATION message to indicate the error. In some instances, these routes may actually be selected as the best route for forwarding; however, packets may not reach the destinations due to the violation of BGP semantics.

Routers from different vendors running different software versions may exhibit distinct default behavior, possibly leading to inconsistent routing decisions in a single network. As a result, simply enforcing uniform routing configurations across all routers in the network may not be sufficient. Thus, a platform such as the RouteNormalizer 300 that dynamically detects routing problems is useful. Occasionally, unexpected BGP updates may also lead to router OS crashes. Thus, eliminating and correcting updates containing such violations early is important to reduce router processing overhead and prevent unexpected router behavior.

A. AS Routing Loops

AS paths containing an AS routing loop often stem from misconfigurations due to a typo in prepending; e.g., [55 1 1 1239 3216 21287 21278 21287 21287] is seen in the RouteView's routing table, a public BGP data source. Such routes may not be unusable. In some rare instances, there may be routing loops allowed in the AS_PATH due to special topology arrangements. However, one cannot count on such paths being accepted by other routers. Thus, to improve routing robustness, it is best to exclude such routes from BGP decision process in selecting the best route to use if alternate routes exist.

Similarly, updates with AS_PATH containing the receiving AS number are also excluded as they constitute routing loops. BGP routers usually perform loop detection on received routing updates; however, excluding such routing updates early reduces processing overhead, and prevents unintended routing behavior.

B. Missing Mandatory Attributes

Another violation of BGP semantics is missing mandatory attributes in the routing updates. Some attributes such as ORIGIN or AS_PATH cannot be easily inferred. However, the NEXT_HOP attribute, which is also mandatory, usually is the interface IP address of the advertising router. The RouteNormalizer 300 can check if other routes have the NEXT_HOP set that way and insert the missing NEXT_HOP value accordingly.

C. Private Information

For eBGP sessions, the values in the BGP attributes in general should not contain private information, such as private IP addresses/prefixes or private AS numbers. For iBGP sessions, such values are meaningful only if they denote address blocks or network information within the local network. For all sessions, bogon prefixes or prefixes that have not been allocated by address registries should not be announced. The RouteNormalizer 300 checks if the AS_PATH, AGGREGATOR, NEXT_HOP, and address prefix contain any such private or illegal information, and issues relevant warnings. One negative consequence of allowing such routing information is that it may impact forwarding for legitimate destinations using private address blocks inside the local network.

In general, there may not be many classes of updates that violate BGP semantics due to the flexibility of routing policies and ambiguities of the protocol specification. If the RouteNormalizer 300 is initialized with the local routing policies, more semantically incorrect updates can be identified. Routing updates in this category can be corrected or filtered using route filters within the routers; however, there is a limited number of filters one can configure and furthermore this imposes additional overhead. Identifying such updates early before they reach the router helps prevent the router being overloaded.

II. Correct Violations of Routing Policies

Although there is large amount of freedom in defining routing policies by individual network providers, some guidelines may be established for specifying routing policies.

A. Export Policy Violations

The RouteNormalizer 300 identifies the class of updates that violate BGP routing policies, especially those associated with the local AS. For example, a multi-homed customer, or a customer peering with more than one upstream provider, is not allowed to advertise routes received from one provider to another. This is because the customer typically does not have the incentive to do so; furthermore, it usually does not have enough capacity to provide transit service between its two providers. Such violations of the so-called export policies can be easily identified by checking the AS relationship between the customer AS and the nexthop AS beyond the customer AS in the AS_PATH of the routes advertised by the customer router.

To generalize policy violations, the RouteNormalizer 300 checks the AS_PATH to identify the relationship between consecutive AS pairs. It attempts to detect export misconfigurations, which is an inadvertent export of a route to a BGP peer in violation of routing policy. The valid routing policy determines the AS path to be in the form of Customer-Provider* Peer-Peer? Provider-Customer* (known as AS path "valley-free" rule), where "*" represents zero or more occurrence of such type of AS edge and "?" represents at most one occurrence of such type of AS edge.

B. Nexthop Violations

Typically the routes advertised by a neighboring router in the BGP session correspond to the routes in the forwarding table of the neighbor. This means that the neighbors are willing to carry traffic on behalf of the local router receiving the routing advertisements. Thus, one can assert two invariants in the routing updates received by the local router. The nexthop AS, i.e., the first AS number in the AS path, should correspond to the AS of the neighbor's network in eBGP sessions. And the nexthop attribute should be the interface IP address of the remote router. Otherwise, the routes advertised will not correspond to traffic going through the neighbors.

If any of these two assertions fails, the RouteNormalizer 300 generates an alarm. Based on the policies specified by the user, it can either correct the routing updates or drop them. Note, even if the routing updates are corrected by setting the nexthop AS and IP addresses to be the expected values, packets are not guaranteed to reach the destinations. Routing policy violation checks are more difficult to perform inside the router due to the requirement of external information, such as AS relationships.

III. Detect Routing Anomalies

The RouteNormalizer 300 identifies routing anomalies by examining the routing data locally received from the BGP neighbors. Correlating BGP update data from multiple locations can provide a network-wide view to help consistency checking and potentially discover additional routing anomalies. Data from publicly available BGP monitors like Oregon RouteViews project and RIPE NCC may be used to identify routing anomalies. The key idea of routing anomaly detection using data from multiple locations is to (i) identify deviations from average behavior, (ii) perform consistency checking, and (iii) track announcements of one's own address blocks.

A. Anomalous Routing Behavior

The RouteNormalizer 300 establishes a routing profile consisting of characteristics such as the distribution of routes in terms of AS_PATHs, ASes, and number of routes from each neighbor. This profile is tracked over time and across data from each vantage point. For example, one check is to count the number of prefixes advertised by one's neighbor. If there is a sudden surge or decline in the number, it is flagged as a routing anomaly. Another example is to detect routes with unusually long AS paths compared to the history data. One way to find anomalies is to identify frequently changing values, implying instability in the routing system. For instance, if we find a prefix's origin AS frequently changes, resulting in Multiple Origin AS (or MOAS) anomalies (where a prefix appears in routes with different origin ASes), such anomalies should be flagged and their associated routes should not be used to forward traffic if alternate routes exist.

B. Routing Inconsistency

The second objective refers to the identification of inconsistent route advertisements excluding transient convergence effects. Assuming each AS advertises its best path consistently across all peering locations to all its neighbors complying to its export policies, the relevant AS_PATH of the route for a given destination observed from different locations should be of the same length leading to the final destination AS. This assumption is commonly held to be true as the protocol specifies, also based on the well-known definition of an AS. Identifying violations of such assumption is important and feasible if the RouteNormalizer 300 receives feeds from more than one remote router. The consequence of inconsistent routing advertisements is that unintended routing that deviates from the usual practice of "hot potato routing" may occur in the AS receiving such updates, resulting in increased network cost.

C. Address Space Hijacking

Address space hijacking is of considerable interest given the danger of IP address hijacks and traffic black-holes. This also illustrates the usefulness of correlating BGP data from multiple locations. Address space hijacking refers to the case when a network announces a route as the originator to the address block it does not own. The last AS in the AS_PATH is the originating AS. Spammers are known to take advantage of hijacked address spaces to avoid being identified. Such instances have also occurred due to misconfigurations. If one monitors BGP data from multiple locations, there is a higher probability of catching the illegal route announcement.

To detect hijacking attempts for locally originated address blocks, the RouteNormalizer 300 uses the knowledge of which address blocks originate from the local network. It is important to identify whether other neighbors and remote BGP data sources announce updates to locally owned address blocks to detect obvious hijacking attempts. To increase the confidence in identified address hijacking attempts, the RouteNormalizer 300 correlates the suspected hijacked address blocks with other data sources, such as a Spam Archive and blacklisted addresses from predefined sites. The correlation is performed by checking if there are common address blocks in the blacklists or SMTP servers with the suspected addresses. This is beneficial, as attackers very likely use hijacked address blocks to launch denial of service attacks or send spam messages.

IV. Mitigate Routing Instability and Manage Load

Routing instability and attacks often incur a large number of updates. Processing such updates adds extra overhead given already limited resources on the local router. The RouteNormalizer 300 helps manage the load on routers by mitigating routing instability and minimizing unnecessary updates processed by the local router in the following ways.

A. Identical Routing Updates

The inventors have found on average about 5% of updates from RouteViews consist of identical BGP updates compared to the last update for the same prefix. Such information is usually due to router software bugs. These updates are not at all useful for route computation; however, they may consume router resources. The RouteNormalizer 300 can detect their presence and drop them.

B. Resource-Based Router DoS Attacks

In addition to correcting routing updates, route normalization also protects routers from becoming overloaded by delaying routing updates and blocking denial service attack attempts at the router. It has been observed that attackers flood routers at TCP port 179 using SYN flood where the BGP process resides. The RouteNormalizer 300 can filter out such packets preventing them from ever reaching the router unnecessarily consuming router resources.

C. Instability Due to Flapping Prefixes

Occasionally, a large number of routing updates stem from unstable prefixes that continuously go up and down due to flaky hardware, for instance. Delaying updates for such unstable or frequently changing routes can significantly reduce router processing overhead as only the latest update needs to be propagated. It can also reduce transient routing changes. BGP has this so-called route flap damping algorithm designed to punish unstable routes by excluding them in the best route selection process. Flap damping requires keeping track of the update history for each prefix and can lead to memory exhaustion. Furthermore, unlike TCP's flow control algorithm, it does not slow down or rate-limit the source. According to the recommendation in BGP specification, a BGP speaker should wait at least 30 seconds in sending successive updates to its neighbor for the same destination. However, the default setting of a typical router is 0 seconds.

By delaying routing updates, the RouteNormalizer 300 is effectively slowing down the sending rate, needed to prevent router overload. The RouteNormalizer 300 can also effectively emulate the flap damping algorithm in a modified way by ensuring that routes are only suppressed when at least one alternate route exists. This ensures that flap damping will not be triggered during routing convergence process affecting reachability.

In some cases of unstable prefixes, the update pattern consists of successive announcements, i.e., attribute changes. Compared to the previous announcement, the subsequent announcement may contain only changes in attributes that are not used for the local router's best route selection process. For example, there may exist some input filters in the local router that reset some of such attributes. As a result, values of these attributes are ignored. To minimize the load on the local router, updates containing only changes of attributes not used for the BGP decision process on the local router can be safely dropped without affecting the BGP semantics.

D. Instability Induced by Session Reset

It is also not uncommon for a BGP router to receive a large number of legitimate updates from its neighbors due to sudden significant routing changes or session resets. It has been shown that a single link failure can result in significant number of prefixes changing its NEXT BOP due to hot potato routing practice. Session resets can occur due to network congestion leading to keep-alive timer timeout, as observed during worm breakout. Upon session re-establishment, the entire routing table of both routers in the BGP session, each consisting of typically more than 100,000 routes in a default-free table, needs to be exchanged, causing significant update processing overhead on the route processors. After exchanging the best routes right after the session is re-established, the routes received from the neighbor of the BGP session may result in further changes in the best routes due to route re-computation, inducing even more routing updates. If the router has multiple BGP sessions, as it is commonly the case with core Internet routers, the router can be easily overwhelmed and become unresponsive in forwarding packets.

A graceful restart mechanism for BGP can minimize the effects on routing caused by BGP session reset. To take advantage of the graceful restart feature, the routers need to support such capability so that End-of-RIB marker is sent and routes are retained even after session reset for a bounded time. However, many routers today may not support such capability, especially the legacy routers with outdated router software. The RouteNormalizer 300 can emulate the graceful restart functionality and further improves it by ensuring there are no inconsistent routing information.

To summarize, the RouteNormalizer 300 can completely emulate the capability of the graceful restart capability by minimizing the disruptions to the local router. Furthermore, it ensures consistent routing while the session is down.

E. General Guidelines

Several general guidelines that apply to the above functionalities dealing with routing instability are now discussed. First, whenever the RouteNormalizer 300 delays routing updates on behalf of the local router, the imposed delay can be computed based on the inferred load. The RouteNormalizer 300 can infer the local router's load by observing the sending rate of routing traffic and data traffic if available. This does not affect the connectivity as long as alternate routes exist. Furthermore, it does not even affect routing decisions, if the current best route is not impacted by the update. If this is not the case, there is clearly a trade-off between routing consistency and maintaining low router load.

Second, unstable routes may affect routing decisions if the routes are preferred over alternate routes. For example, assuming the local router always prefers a route going through the remote router $R_1$ instead of the one advertised by remote router $R_2$, then if $R_1$'s route is continuously flapping, this leads to continuous forwarding table instability. The flapping rate may not be enough to trigger route flap damping; however, it still creates significant amount of instability. In such cases, the RouteNormalizer 300 may either suppress the updates associated with the unstable route, or it may suggest a change to the local routing policy to prefer the more stable route from $R_2$.

Functionality provided by the RouteNormalizer 300 to deal with routing instability cannot be easily implemented inside the router, as doing so would directly impact the router load. Precisely when routers are overloaded, such functionality is critical in preventing forwarding plane from being affected.

As discussed above, the framework of route normalization consists of the normalizer module and the policy engine. The latter allows users to customize the output alarm reports and desirable actions. For example, to be conservative, some operators may decide not to drop any routing updates or only drop them if there are alternate routes available. Through the policies, threshold values can also be specified to influence which anomalies are generated. For example. the values for the percentage of deviations from the expected or history values for individual attributes can be configured. Another aspect of configuration allows operators to select specific prefixes or ASes to be closely monitored and also the way the individual alarms should be aggregated.

V. Detailed Routing Anomaly Detection Algorithms

The main functionality or functionalities of the RouteNormalizer 300 are discussed above. In the following description, some of the functionalities are discussed in more detail, focusing on their benefit and improvement over the equivalent functionality at the router. In all the following cases, the router either does not provide such support or the RouteNormalizer 300 significantly improves upon it.

A. Deaggregation Detection

Deaggregation, the opposite of aggregation, refers to the behavior of advertising many small prefixes already covered in larger prefixes. This is one type of route attribute anomaly detection, i.e., the number of prefixes advertised by an AS significantly changes. Deaggregation can be a result of misconfiguration, leaking out many subnets from one's internal network. Or it can be intentional for the purpose of achieving fine-grained traffic engineering. The negative consequence is that the router receiving such announcements may experience router memory exhaustion, possibly leading to router crashes.

To protect against deaggregation, routers currently use a Max-Prefix Limit feature, which by default disables the peering session after the number of received prefixes exceeds the configured maximum number. However, the router does not attempt to differentiate between regular and de-aggregated prefixes, consequently allowing the entire BGP session to be affected. Routers permit the configuration of a restart time, so that the session can be subsequently reestablished. This unfortunately may lead to continuous session resets, if the maximum prefix limit is exceeded again upon session reestablishment.

The RouteNormalizer 300 more intelligently deals with prefix deaggregation. Ideally, when router memory is scarce, routing announcements to prefixes which are contained by prefixes in the existing routing table can be safely dropped without impacting reachability. This may impact routing decisions; however, it prevents possible session resets. The RouteNoffilalizer can make a more intelligent and conservative decision by ignoring prefixes only when they are covered by other prefixes to avoid affecting reachability.

B. Address Hijacking Detection

This functionality is not currently supported by routers and will be difficult for routers to provide due to complex logic and needed external data. Detecting address hijacking relies on having accurate prefix to origin AS mappings; however, there are no such authoritative data sources available. If an alarm is generated for each update that indicates a different origin AS from the latest route of the prefix, there would be many false positives. The reason is that due to multi-homing there are legitimate reasons for MOAS or multiple origin ASes. To remedy this problem, a mapping of prefix to origin AS is developed over time by learning from the history BGP data from multiple vantage points. The following heuristic may be used: if the number of prefixes using the two origin ASes exceeds 100, both origin ASes are considered legitimate. The value 100 is chosen, because the majority of MOAS instances have at least 100 prefixes based on the BGP data. The intuition is that usually hijacking occurs for very few prefixes of small size. It is to be understood that other values may be chosen.

C. Graceful Restart

Some routers today support graceful restart and assume that within a configurable time limit the restarting router can still properly forward traffic. The RouteNormalizer 300 can emulate graceful restart and furthermore enhance routing consistency. The key is to observe whether traffic such as ACK packets are arriving from the remote router indicating that data packets can indeed reach the destinations through the remote router. If this is not the case, the RouteNormalizer 300 will withdraw the routes advertised by the remote router for which alternate routes exist at the local router to ensure traffic is not blackholed unnecessarily.

There is cost for withdrawing such routes, as the local router will propagate the routing changes to its neighbors. Nevertheless, the benefit is that while the session is down, minimal traffic is impacted. During the time the session is down, the RouteNormalizer 300 keeps track of the latest updates from the local router to the restarting remote router. Once the session comes up, the remote router re-announces its entire forwarding table to the RouteNormalizer 300, which in turn only selectively forwards those routes that were previously withdrawn and in addition any changed routes compared to before the session reset. From the RouteNormalizer 300 to the remote router, the latest local router's forwarding table is sent. The added intelligence ensures that only necessary routes are exchanged upon session reestablishment.

D. Instability Detection

BGP already has route flap damping as specified in RFC2439 to help deal with routing instability. The RouteNormalizer 300 can help emulate it if it is not supported by the local router. Doing so would help reduce the processing and memory overhead. An improvement over the existing flap damping algorithm is disclosed herein, which only focuses on instability at short time scales. For a prefix that flaps slowly over time and then increases its flapping frequency, route flap damping may not identify it as anomalous if the new frequency does not cause the flapping penalty value to exceed the threshold. However, changes in flapping behavior may signal some routing problems and should be detected. The modified flap damping algorithm to address this is shown below:

```
Procedure DETECT_INSTABILITY( )
 1:  Receive a routing message;
 2:  if Message_type is UPDATE message then
 3:      for Each prefix p in the NLRI field do
 4:          Find prefix p announced from peer N
 5:          Δt = last inter-arrival time for p
 6:          Self_Adaptive_Ratio = MIN( Δt / E(Δt,)_{x,N} )
 7:          Penalty_{x,N} = Penalty_{x,N} * e^{-λ*(Self_Adpative_Ratio)*Δt}
 8:          E(Δt,)_{x,N} = E(Δt,)_{x,N} * α + Δt * (1- α)
 9:      end for
10:  end if
```

The main change is the computation of the $\lambda$ value, which determines how fast the penalty value decays over time. Instead of using a static value, the new algorithm adapts it based on the changes in the update inter-arrival time or update frequency. The expected inter-arrival time $E(\Delta t,)_{x,N}$ is calculated using EWMA (Exponentially Weighted Moving Average) with a=0.3 as the weight.

Figure 4:
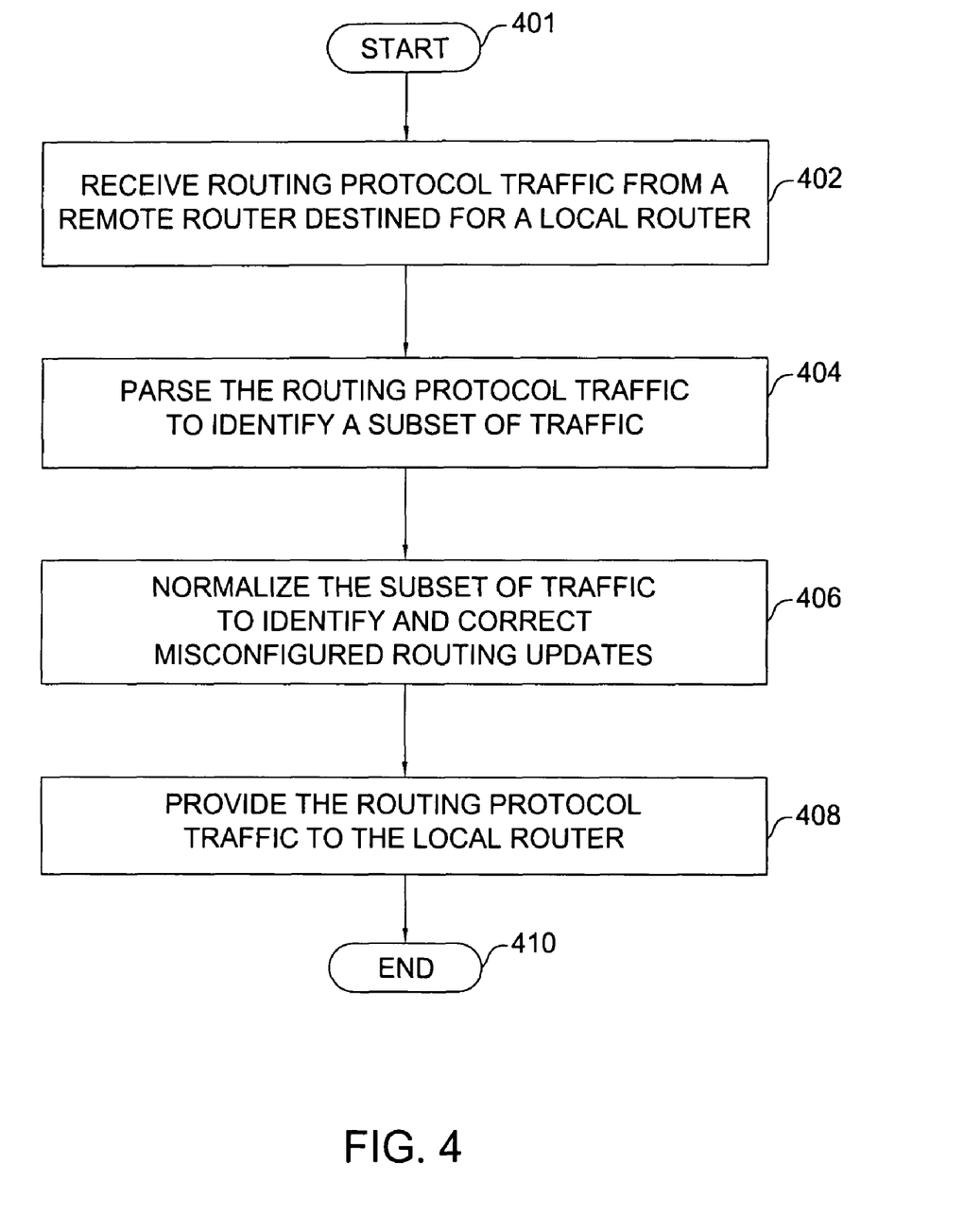
FIG. 4 is a flow diagram depicting an exemplary embodiment of a method for mitigating routing misbehavior in a network in accordance with one or more aspects of the invention.

FIG. 4 is a flow diagram depicting an exemplary embodiment of a method 400 for mitigating routing misbehavior in a network in accordance with one or more aspects of the invention. The method 400 begins at step 401. At step 402, routing protocol traffic is received from a remote router destined for a local router. In one embodiment, the routing protocol traffic comprises BGP traffic. At step 404, the routing protocol traffic is parsed to identify a subset of the traffic. In one embodiment, the subset of traffic comprises BGP update messages.

At step 406, the subset of traffic is normalized to identify and correct misconfigured routing updates. In one embodiment, the subset of traffic is normalized by performing at least one of detecting and correcting routing protocol semantics, detecting and correcting violations in routing policies, detecting and correcting routing anomalies, and mitigating routing instability. At step 408, the routing protocol traffic is provided to the local router. The method 400 ends at step 499.

Figure 5:
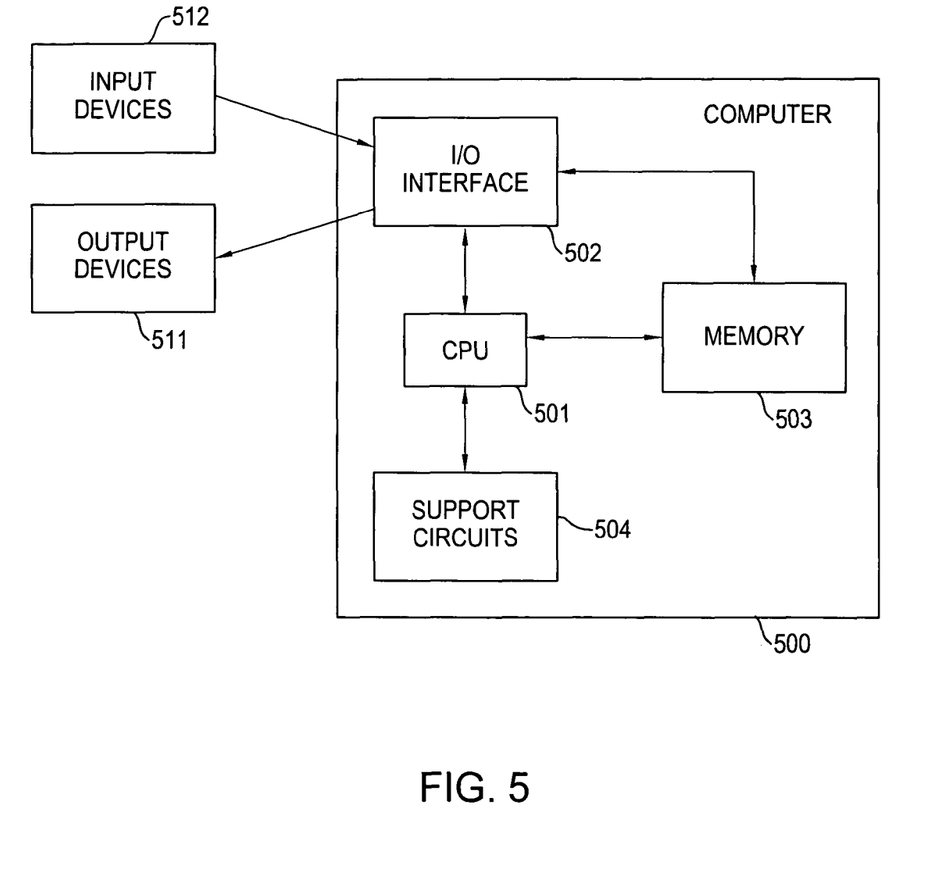
FIG. 5 is a block diagram depicting an exemplary embodiment of a computer suitable for implementing the processes and methods described herein.

FIG. 5 is a block diagram depicting an exemplary embodiment of a computer 500 suitable for implementing the processes and methods described herein. Notably, the computer 500 may be used to implement the RouteNormalizer described above the method 400 of FIG. 4. The computer 500 includes a central processing unit (CPU) 501, a memory 503, various support circuits 504, and an I/O interface 502. The CPU 501 may be any type of microprocessor known in the art. The support circuits 504 for the CPU 501 include conventional cache, power supplies, clock circuits, data registers, I/O interfaces, and the like. The I/O interface 502 may be directly coupled to the memory 503 or coupled through the CPU 501. The I/O interface 502 may be coupled to various input devices 512 and output devices 511, such as a conventional keyboard, mouse, printer, and the like.

The memory 503 may store all or portions of one or more programs and/or data to implement the processes and methods described herein. Notably, the memory 503 may store program code to be executed by the CPU 501 for implementing the RouteNormalizer described above performing the method 400 of FIG. 4. Although one or more aspects of the invention are disclosed as being implemented as a computer executing a software program, those skilled in the art will appreciate that the invention may be implemented in hardware, software, or a combination of hardware and software.

Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of mitigating routing misbehavior in a network, comprising:
   receiving routing protocol traffic from a remote router destined for a local router by a route normalizer disposed between the remote router and the local router in the network;
   parsing the routing protocol traffic to identify a subset of routing update messages;
   normalizing the subset of routing update messages to identify and correct misconfigured routing updates, wherein the normalizing comprises detecting and correcting violations of routing protocol semantics, wherein the detecting and correcting violations of routing protocol semantics comprises detecting missing mandatory attributes in the subset of routing update messages, wherein the normalizing further comprises:
      detecting and correcting violations in routing policies;
      detecting and correcting routing anomalies; and
      mitigating routing instability; and
   providing the subset of routing update messages that is normalized to the local router.

2. The method of claim 1, wherein the routing protocol traffic comprises border gateway protocol traffic, and wherein the subset of routing update messages comprises border gateway protocol update messages.

3. The method of claim 1, wherein the detecting and correcting violations of routing protocol semantics further comprises:
   performing an autonomous system loop detection; and
   detecting private information.

4. The method of claim 1, wherein the detecting and correcting violations in routing policies comprises:
   detecting export policy violations; and
   detecting nexthop violations.

5. The method of claim 1, wherein the detecting and correcting routing anomalies comprises:
   comparing the subset of routing update messages with an established routing profile to detect anomalous routing behavior;
   identifying inconsistent route advertisements; and
   identifying address space hijacking.

6. The method of claim 1, wherein the mitigating routing instability comprises:
   dropping identical routing updates;
   filtering denial of service attacks;
   delaying updates for unstable routes; and
   emulating a graceful restart capability.

7. Apparatus for mitigating routing misbehavior in a network, comprising:
   a processor comprising hardware, the processor configured to:
      receive routing protocol traffic from a remote router destined for a local router, wherein the processor is disposed between the remote router and the local router in the network;
      parse the routing protocol traffic to identify a subset of routing update messages;
      normalize the subset of routing update messages to identify and correct misconfigured routing updates, wherein the processor is configured to normalize the subset of routing update messages by detecting and correcting violations of routing protocol semantics, wherein the detecting and correcting violations of routing protocol semantics comprises detecting missing mandatory attributes in the subset of routing update messages, wherein the processor is further configured to normalize the subset of routing update messages by:
         detecting and correcting violations in routing policies;
         detecting and correcting routing anomalies; and
         mitigating routing instability; and
      provide the subset of routing update messages that is normalized to the local router.

8. The apparatus of claim 7, wherein the routing protocol traffic comprises border gateway protocol traffic, and wherein the subset of routing update messages comprises border gateway protocol update messages.

9. The apparatus of claim 7, wherein the detecting and correcting violations of routing protocol semantics further comprises:
   performing an autonomous system loop detection; and
   detecting private information.

10. The apparatus of claim 7, wherein the detecting and correcting violations in routing policies comprises:
    detecting export policy violations; and
    detecting nexthop violations.

11. The apparatus of claim 7, wherein the detecting and correcting routing anomalies comprises:
    comparing the subset of routing update messages with an established routing profile to detect anomalous routing behavior;
    identifying inconsistent route advertisements; and
    identifying address space hijacking.

12. The apparatus of claim 7, wherein the mitigating routing instability comprises:
dropping identical routing updates;
filtering denial of service attacks;
delaying updates for unstable routes; and
emulating a graceful restart capability.

13. A non-transitory computer readable storage medium having stored thereon instructions that, when executed by a processor, cause the processor to perform a method of mitigating routing misbehavior in a network, comprising:
receiving routing protocol traffic from a remote router destined for a local router by a route normalizer disposed between the remote router and the local router in the network;
parsing the routing protocol traffic to identify a subset of routing update messages;
normalizing the subset of routing update messages to identify and correct misconfigured routing updates, wherein the normalizing comprises detecting and correcting violations of routing protocol semantics, wherein the detecting and correcting violations of routing protocol semantics comprises detecting missing mandatory attributes in the subset of routing update messages, wherein the normalizing further comprises:
detecting and correcting violations in routing policies;
detecting and correcting routing anomalies; and
mitigating routing instability; and
providing the subset of routing update messages that is normalized to the local router.

14. The non-transitory computer readable storage medium of claim 13, wherein the detecting and correcting violations of routing protocol semantics further comprises:
performing an autonomous system loop detection; and
detecting private information.

15. The non-transitory computer readable storage medium of claim 13, wherein the detecting and correcting violations in routing policies comprises:
detecting export policy violations; and
detecting nexthop violations.

16. The non-transitory computer readable storage medium of claim 13, wherein the detecting and correcting routing anomalies comprises:
comparing the subset of routing update messages with an established routing profile to detect anomalous routing behavior;
identifying inconsistent route advertisements; and
identifying address space hijacking.

17. The non-transitory computer readable storage medium of claim 13, wherein the mitigating routing instability comprises:
dropping identical routing updates;
filtering denial of service attacks;
delaying updates for unstable routes; and
emulating a graceful restart capability.

* * * * *